United States Patent [19]

Inoue

[11] Patent Number: 4,503,309
[45] Date of Patent: Mar. 5, 1985

[54] EDM METHOD AND APPARATUS WITH SUCCESSIVE TRAINS OF INTERMITTENTLY ENLARGED ELEMENTARY PULSES

[75] Inventor: Kiyoshi Inoue, Tokyo, Japan

[73] Assignee: Inoue-Japax Research Incorporated, Yokohama, Japan

[21] Appl. No.: 56,856

[22] Filed: Jul. 12, 1979

[30] Foreign Application Priority Data

Jul. 21, 1978 [JP] Japan .................................. 53-89648
Sep. 18, 1978 [JP] Japan .................................. 53-114933

[51] Int. Cl.³ .............................................. B23P 1/08
[52] U.S. Cl. .............................. 219/69 M; 219/69 P; 219/69 C
[58] Field of Search ................ 219/69 P, 69 M, 69 C

[56] References Cited

U.S. PATENT DOCUMENTS 3,864,541  2/1975  Inoue ................................. 219/69 C

FOREIGN PATENT DOCUMENTS

4410595  3/1965  Japan ................................. 219/69 P
4749875  2/1969  Japan ................................. 219/69 C
44-8317  4/1969  Japan .
4716314  6/1970  Japan ................................. 219/69 C
50-123053  9/1975  Japan ................................. 219/69 P
1176981  1/1970  United Kingdom .
1193835  6/1970  United Kingdom .
1447661  8/1976  United Kingdom .

Primary Examiner—Clifford C. Shaw
Attorney, Agent, or Firm—Karl F. Ross; Herbert Dubno

[57] ABSTRACT

EDM method and apparatus in which the electrical discharge machining pulses are triggered by the application across the machining gap of a succession of pulse trains of discrete elementary pulses whose duration and peak current are preset for a desired machining result. At least one of the elementary pulses in each train is increased with respect to its energy content, i.e. the energy discharged through the machining gap, substantially higher than the preset value to permit machining to continue with stability or for restoration of the stable machining action when the gap becomes unstable due to its reduced spacing. The increase of the energy is effected by increasing one or both of pulse duration and pulse peak current. The proportion of the number of increased energy pulse over the number of preset elementary machining pulses or the proportion in energy content or consumption of increased energy pulses to preset elementary machining pulses is set to be not greater than 15%, preferably not greater than 10%.

16 Claims, 8 Drawing Figures

EDM METHOD AND APPARATUS WITH SUCCESSIVE TRAINS OF INTERMITTENTLY ENLARGED ELEMENTARY PULSES

FIELD OF THE INVENTION

The present invention relates to an EDM (electrical-discharge-machining) method and apparatus and, more particularly, to an improved method of and apparatus for electrical-discharge-machining of a workpiece juxtaposed with a tool electrode across a fluid-filled machining gap by applying across the machining gap pulse trains individually consisting of elementary pulses of predetermined on-time $\tau$on and off-time $\tau$off, the pulse trains having a duration Ton with the successive trains being separated by a cut-off time interval Toff.

BACKGROUND OF THE INVENTION

In EDM, electric energy is supplied in the form of discrete electrical pulses across the machining gap filled with a machining fluid or liquid dielectric (e.g., kerosine, transformer oil, distilled water or weakly conductive water) to effect a succession of electrical discharages between the tool electrode and the workpiece to remove material from the latter. As material removal proceeds, the tool electrode is advanced relatively toward the workpiece by servo feed means adapted to maintain the machining gap spacing substantially constant thereby to allow material-removal discharges to be successively created. The contamination of the machining gap region with chips, tar and gases produced by machining discharges may be removed by continuously or intermittently flushing the gap with the fresh machining fluid and/or intermittently or cyclically retracting the tool electrode away from the workpiece to allow the fresh machining medium to be pumped into the machining gap and the machining contaminants to be carried away from the latter.

Parameters of individual and successive electrical discharges, i.e. pulse on-time Ton, peak current Ip and off-time Toff, are determinative of machining results, e.g. removal rate, surface roughness and relative electrode wear and, therefore, are individually or in combination particularly adjusted to establish a particular machining condition suitable to achieve desired machining results.

As proposed by the inventor in Japanese Patent Specifications No. 39-20494 published Sept. 19, 1964 and No. 44-8317 published Apr. 18, 1969, there is known an improved EDM pulse supply technique in which a succession of pulses trains individually consisting of elementary pulses of predetermined on-time $\tau$on and off-time $\tau$off are applied across the machining gap, the pulse trains having a duration Ton with the successive trains being separated by a cut-off time interval Toff. Elementary pulses in each train may be modified as to its triggering or peak voltage v as described in the aforementioned Japanese Patent Specification No. 44-8317. Others have also proposed various circuits generally of this or similar genre, which are described, for example, in U.S. Pat. No. 3,056,065 and No. 3,943,321.

Fine-surface and precision machining results are obtainable with a train of elementary pulses of a duration $\tau$on set to be short and preferably at a minimum which, when repeated at an elevated frequency or with a pulse interval $\tau$off set to be at most equal in length to the pulse duration $\tau$on, permits an increased removal rate to be obtained. The shortness of the pulse interval $\tau$off may, however, cause the production of machining chips and other products to being about a continuous arc discharge with ease within a short time period. This possibility can advantageously be eliminated or alleviated by the presence of cutoff time periods Toff which separate from one another the successive trains Ton of elementary pulses ($\tau$on, $\tau$off). Thus, the cyclic interruption of elementary pulses allows accumulated machining products to be carried away within each interruption period from the machining gap and may thereby serve to maintain the latter substantially free from continued contamination. By establishing the cut-off interval Toff at a level sufficient to allow clearing of the contaminants resulting from the machining action of the previous train of elementary pulses, the gap can be ready to accept the next train of elementary pulses to continue stabilized machining discharges.

On the other hand, in the interest of increasing the removal rate, it is desirable to have the electrode-feed servo system operate so as to minimize production of non-striking pulses or pulses without discharge. In order to facilitate production of discharges under application of successive trains of elementary pulses, the gap can be reduced but this can also facilitate production of a continuous arc or result in difficulty in gap flushing or decontamination. The attempt to facilitate machining discharges by reducing the number of elementary pulses in each train causes a drop in removal rate while the setting of the servo system so as to widen the threshold gap spacing leads to an increased frequency of non-striking pulses.

OBJECTS OF THE INVENTION

It is accordingly the object of the present invention to provide an improved EDM method whereby an increased removal rate is attained.

Another object of the present invention is to provide an improved EDM method which eliminates or overcomes the gap instability arising from an excessively reduced gap spacing.

A further object of the present invention is to provide an improved EDM apparatus for carrying out the method.

SUMMARY OF THE INVENTION

These and other objects are attained in accordance with present invention by an improved EDM method which comprises: applying across the machining gap a succession of pulse trains individually consisting of elementary pulses of predetermined on-time $\tau$on and off-time $\tau$off, the pulse trains having a duration Ton with the successive trains being separated by a cut-off time interval Toff; and increasing at least one of said elementary pulses in each train with respect to its energy content to be substantially higher than a predetermined value at which said elementary pulses are set to achieve desired machining results. This method permits machining to continue with stability or restoration of the stable machining when the gap becomes unstable due to its reduced spacing. The increase of the energy is effected by increasing one or both of pulse duration and peak current, preferably the latter. The proportion of the number of increased energy pulses over the number of preset elementary machining pulses or the proportion in energy content or consumption of increased energy pulses to the remaining preset elementary pulses in each train is set to be not greater than 15%, preferably not greater than 10%.

An apparatus for carrying out the method, in accordance with a further feature of the invention, may comprise power supply means for applying across the machining gap a succession of pulse trains individually consisting of elementary pulses of predetermined on-time $\tau$on and off-time $\tau$off, the pulse trains having a duration Ton with the successive trains being separated by a cut-off time interval Toff, and means associated with the power supply means for distributing among the elementary pulses in each train at least one auxiliary pulse having an energy content higher than that of said elementary pulses.

Preferably, the power supply means comprises a main DC source and a power switch for connecting the main DC source with the machining gap to apply thereacross a succession of pulse trains of the elementary pulses and the aforementioned means associated with the power supply means includes an auxiliary DC source of an output voltage higher than that of said main DC source, a storage capacitor for charging by the auxiliary DC source and a power switch controlledly turned on for discharging the storage capacitor to effect an increased-energy pulse through the machining gap for distribution among the other elementary pulses.

SPECIFIC DESCRIPTION

Figure 1:
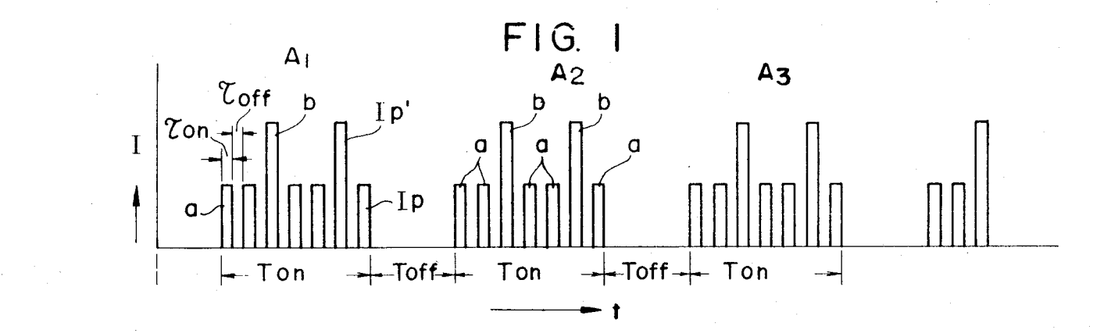
FIG. 1 is a waveform diagram illustrating a succession of trains of machining pulses according to the present invention.

FIG. 1 illustrates a succession of trains A1, A2, A3, . . . of pulses according to the present invention. Each train A1, A2, A3, . . . basically comprises elementary machining pulses a having a predetermined pulse duration $\tau$on, pulse interval $\tau$off and a peak current Ip all of which are preset in accordance with desired machining results, especially the particular surface to be obtained, with electrode materials, polarities and other machining parameters taken into account. Typically, the elementary pulse duration $\tau$on is in the range between 1 and 100 $\mu$sec. and the pulse interval $\tau$off in the range between 10 and 50 $\mu$sec. Each train A1, A2, A3, . . . has a duration Ton with the successive trains being separated by a cut-off interval Toff. The latter need to be sufficient to enable the machining gap to be decontaminated from the preceding discharges and ready to accept the suceeding machining pulses a while the duration Ton of each train A interposed between the successive cut-off intervals Toff should be limited within a time period in which elementary pulses a applied with short or minimum intervals $\tau$off are allowed to create dispersive, discrete, independently pulsed discharges without causing a continuous arc discharge which is likely to occur as the machining chips and other products accumulate. Typically, the duration Ton and the interval Toff of trains A are selected from the range between 10 $\mu$sec and 1 msec. One or both of Ton and Toff may be variably controlled in a given machining operation in response to the progress of machining, e.g. to change in machining area as described in my copending application Ser. No. 018,637 filed Mar. 8, 1979.

In accordance with the present invention, each train A1, A2, A3, . . . has energy-increased pulses b included among elementary machining pulses a at a proportion not greater than 15% in number and total energy content or consumption thereof. In the illustration, the increased energy pulses b are shown having an increased peak current Ip' and a pulse duration which may be equal to the pulse duration $\tau$on of elementary machining pulses a and are shown for every three elementary pulses a. The increased energy pulses b are obtainable alternatively by increasing the pulse duration only or both the pulse duration and the peak current.

Figure 2:
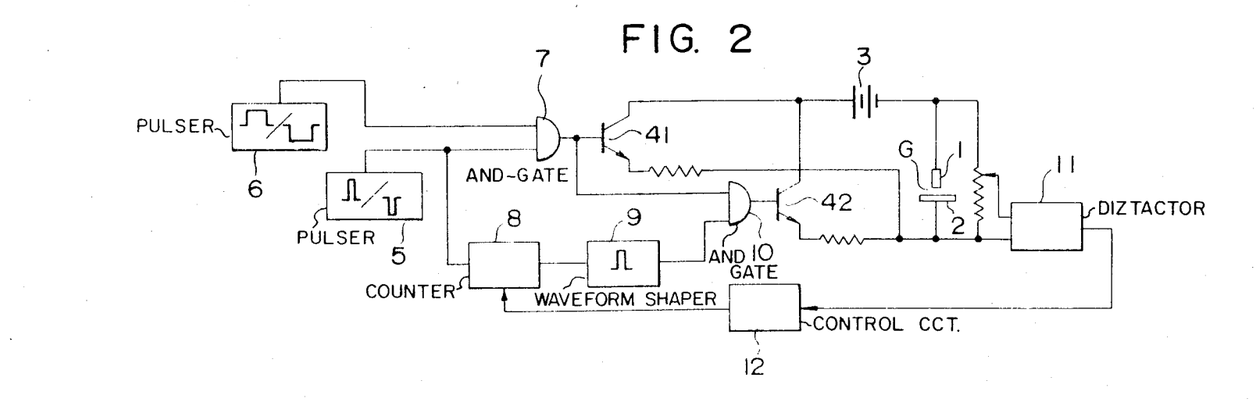
FIG. 2 is a circuit/schematic diagram illustrating a system for embodying the present invention in which pulses of an increased energy, increased by means of an increased peak current or amplitude, are introduced into each train of elementary pulses.

Referring to FIG. 2 which illustrates a pulse supply circuitry adapted to produce a succession of trains of modified elementary pulses a, b in accordance with the principles of the present invention, a tool electrode 1 is shown juxtaposed with a workpiece 2 to form a fluid-filled machining gap G therebetween. A direct-current (DC) power source 3 is connected in series with the tool electrode 1 and the workpiece 2 through a pair of switches 41 and 42 connected in parallel with one another. The switches 41 and 42 may each be a bank of transistors as symbolically shown.

The switch 41 is controlled by a pair of pulsers 5 and 6 which are fed into an AND gate having an output fed into the control electrodes of the switch 41 which is thereby turned on and off. The pulser 5 outputs a succession of signal pulses of a pulse duration $\tau$on and a pulse interval $\tau$off both of which are preset therein in accordance with desired machining conditions while the pulser 6 outputs a succession of signal pulses of a pulse duration Ton and a pulse interval Toff. The two signals combined at the AND gate 7 are used to energize the switch 41 to apply across the machining gap G a succession of pulse trains individually consisting of elementary pulses of the on-time or pulse duration $\tau$on and off-time of pulse interval $\tau$off, the pulse trains having the duration Ton and cut-off interval Toff.

A preset counter 8 is also responsive to the output of the pulser 5 for elementary signal pulses and adapted to count the output pulses thereof and, when they reach a preset number, say, three, to provide a timing signal while being reset. The timing signal is applied to a waveform shaper or timer 9 which may be a one-shot multivibrator to cause the latter to provide a trigger signal which is applied to an input terminal of an AND gate 10. The AND gate 10 has a second input terminal fed from the output of the first-mentioned AND gate 7 and an output terminal fed to the second switch 42 for energizing the latter.

When the counter 8 is actuated to provide the timing signal and consequently the timer 9 provides the gating signal, the switches 41 and 42 are both turned on to connect the power source 3 with the electrode 1 and the workpiece 2 through the parallel branches and operated synchronously. A machining pulse of an increased peak current thus results as shown at b in FIG. 1 and is applied across the machining gap G.

The introduction of energy-increased machining pulses b into each train A of elementary machining pulses a can be effected in a desired manner through a particular setting of the number of counts for resetting in the preset counter 8. For example, an energy-increased pulse b can be provided for every five or ten elementary machining pulses. The waveform shaper or timer circuit 9 can also be adjusted so as to control the duration of an out-put pulse thereof. For example, by setting the latter to correspond to two successive cycles or periods of elementary machining signal pulses generated by the oscillator 5, two energy-increased machining pulses which succeed one after another can be introduced in a series of elementary machining pulses. Conversely, the duration of the output pulse of the timer or waveform shaper 9 can also be set to be a time period shorter than that of elementary signal pulses outgoing from the oscillator 5 so that there results an energy-increased machining pulse that is shorter than or part of elementary machining pulses. The peak current $Ip'$ of energy-increased pulses will amount to twice the peak current $Ip$ of elementary pulses when the two parallel branches provided by the switches 41 and 42 have an equal effective resistance. The number of the parallel switches can be increased to provide an increased peak current.

The introduction of energy-increased machining pulses into each train of elementary machining pulses offers a stability increase to the servo system required to effect the follow-up feed of the tool electrode 1 relative to the workpiece 2 so as to maintain the gap G spacing constant. Thus, the gap spacing l to be controlled by the servo system is generally expressed as follows:

$$l = K(\tau on \cdot s)^{\frac{1}{2}} Ip \tag{1}$$

where $\tau on \cdot s$ is the duration of machining pulses, $Ip$ is the peak current and K is a constant. The servo system being much slower in response than the gap G is to machining pulses, the parameter $Ip$ can be represented by the average machining current. It can then be seen that the greater the machining current is the wider the gap spacing. Thus, an increased machining gap spacing will result when there is introduced a pulse increased of energy, especially increased in terms of peak current, into a series of elementary pulses. Since the servo follow-up response is much slower than the frequency of pulses as noted above, an expanded machining gap is established permitting the machining action to continue with an increased stability The system shown in FIG. 2 also includes a detector circuit 11 for sensing the discharge condition in the machining gap G and may be responsive to current, voltage or resistance at the machining gap detected on the instantaneous or average basis. Thus, the detector 11 may discriminate successive machining pulses applied to the gap G into good and bad pulses or may provide signal pulses corresponding to occurrence of a satisfactory discharge pulse, a short-circuiting or arc-discharge pulse and an open-gap or idling pulse, respectively, for processing by a control circuit 12 provided in the next stage to modify the preset level of the preset counter 8 for the pulsing circuit for the energy-increased pulses. For example, when an increased proportion of idling pulses are detected indicating an excessively widened gap spacing, the control circuit 12 may operate to change the preset level of the counter 8 such that the proportion of energy-increased pulses b to the other elementary pulses a may be decreased. When an increased proportion of short-circuiting or arc-discharge pulses is detected indicating that the gap has narrowed excessively, the counter 8 is controlled to have a reduced count level such that the proportion of energy-increased pulses are augmented. In this manner, the gap G is held at an optimum spacing to allow production of successive discharges with an increased stability.

By variably introducing energy-increased pulses among elementary pulses in each train, the need for change in the voltage applied across the gap for the purpose of controlling the gap spacing is eliminated and a reduced constant voltage can be employed for successive discharges to allow a stabilized machining. Since a stable machining is allowed to proceed, the duration Ton of individual pulse trains or the number of elementary pulses included in each train can be lengthened with a reduced inter-train interval allowed to bring about an increased removal rate.

It has been shown that for a single machining pulse, the increase of the peak current twice brings about merely a 1.2 time increase in surface roughness. By limiting the proportion of energy-increased pulses b included among elementary machining pulses a in each train A by at most 15%, preferably at most 10%, it has thus been found that there is no material change in machining surface roughness that ensues according to this invention.

EXAMPLE I

Figure 5:
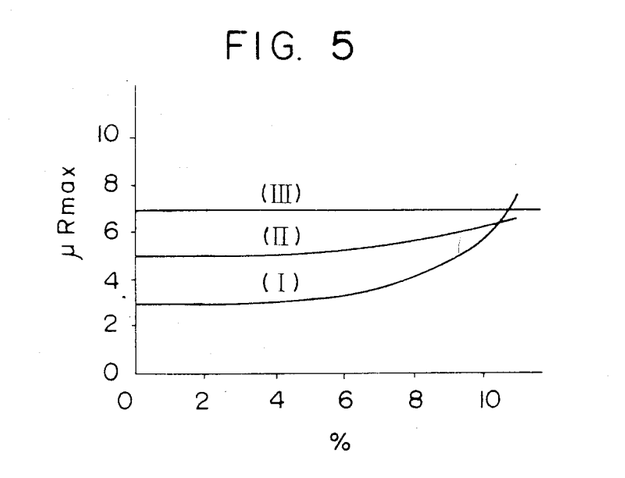
FIG. 5 is a graph illustrating how the proportion of energy increased pulses to preset average machining pulses in number or in energy content affects on the machining surface roughness.

A steel workpiece was machined by EDM with a copper tool electrode under three different pulse conditions (I), (II) and (III) of trains of elementary machining pulses applied, in which commonly $\tau$on and $\tau$off were 1.5 $\mu$sec and 5.5 $\mu$sec, respectively. The peak current Ip had 3A, 6A and 13.5A in (I), (II) and (III), respectively and elementary machining pulses were substituted at various proportions with pulses of the equal duration and increased of energy in term of their peak current twice. In FIG. 5 there is shown a graph which illustrates how the surface roughness is varied as a function of the proportion at which the energy-increased pulses b are included among the elementary machining pulses a. It is seen that when the proportion lies less than 10% there is no material change in the surface roughness and a slight acceptable change results with the proportion limited to at most 15%.

Figure 3:
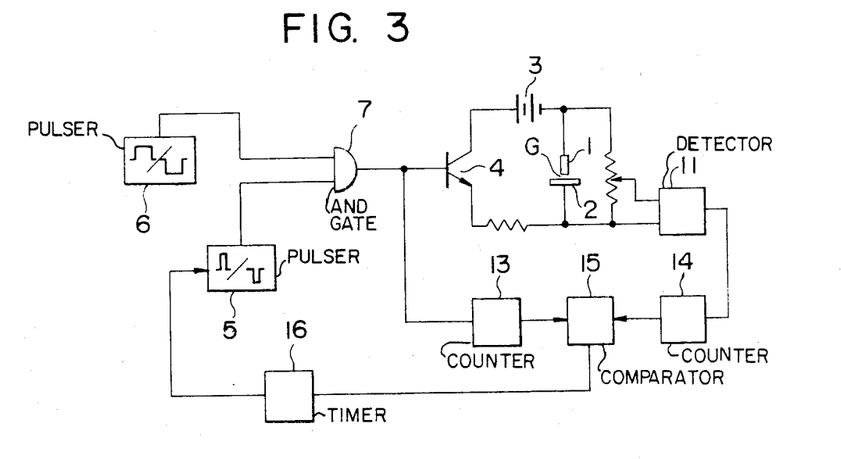
FIG. 3 is a circuit/schematic diagram illustrating an system of the invention in which pulses of an increased energy, increased by means of an increased pulse duration, are introduced into each train of elementary pulses.

In FIG. 3 there is shown another embodiment of the present invention in which a selected portion of elementary pulses is increased of their pulse duration to obtain energy-increased pulses b distributed among the remaining elementary machining pulses a, and in which the same reference numerals as in FIG. 2 designate same or similar components. In this embodiment, a counter 13 is responsive to machining signal pulses applied from the AND gate 7 to a power switch 4 connected in series with the power supply 3 and the tool electrode 1 and the workpiece 2. A counter 14 is provided to count the number of discharges, normal or unsatisfactory pulses, sensed by the detector circuit 11. A comparator 15 is responsive to both the two counters 13 and 14 to provide a comparison signal representing the difference in counts and, when the comparison signal reaches a preset level, to issue a trigger signal. The latter operates a timer circuit 16, which may be a one-shot multivibrator, in the manner to increase the duration $\tau on$ of a elementary pulse by acting on the oscillator 5.

Thus, when the gap monitoring comparator 15 indicates a deterioration in stability in the machining gap G, the timer 16 is operated to act upon the time-determining elements of the oscillator 5 so as to increase the duration $\tau on$ of one or more of successive elementary machining pulses. A more than one predetermined number of successive signal pulses of the oscillator 5 may be increased as to its pulse duration so that the corresponding enlarged machining pulses are generated through the switch 4 and applied, distributed among other elementary machining pulses, across the machining gap G.

Figure 4:
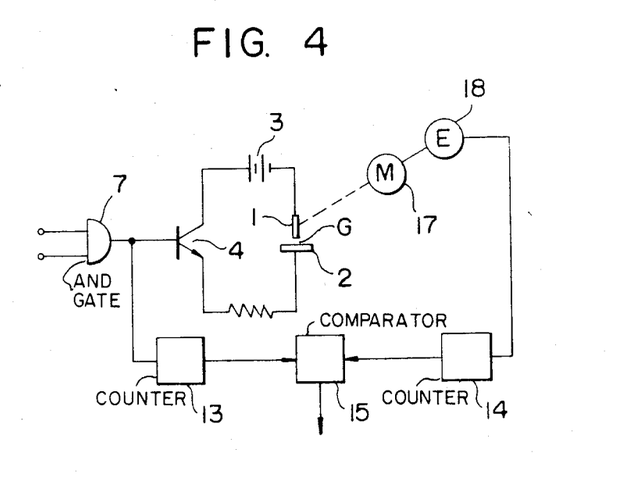
FIG. 4 is a circuit/schematic diagram illustrating a modification for sensing the gap instabilization for actuating a control system according to the invention.

In a further embodiment of the invention shown in FIG. 4, a servo motor 17 for positioning the tool electrode 1 relative to the workpiece 2 so as to maintain the machining gap G constant has an encoder 18 coupled therewith for sensing the electrode feed displacement. In this system, a drop in the rate of displacement of the movable electrode 1, 2 sensed by the encoder 18 indicates that the machining condition is deteriorating and appears at the counter 14 output. As in the previous embodiment, the comparator 15, when the difference in counts incoming from the two counters 13 and 14 reaches a preset threshold, issues a control trigger signal which acts on the oscillator in such a manner that an enlarged pulse is introduced into the elementary pulse train.

It should be noted that a separate time control circuit may be provided to control the oscillator 5 so that energy-increased pulses are generated at predetermined intervals and distributed with the elementary machining pulses.

Heretofore, for gap chips or contamination removal or in order to keep the machining gap clean against contamination with machining products, the cyclic retraction of the tool electrode away from the workpiece has been almost an exclusive measure, which has, however, necessarily entails interruption of machining pulses for a prolonged period in each electrode retraction cycle. In accordance with the present invention, the period of pulse interruption is advantageously reduced as short as each train interval Toff. Furthermore, the need for controlling the applied pulse voltage for the purpose of controlling the gap spacing is eliminated so that the possibility of change in the machined surface roughness is avoided. Without increasing the pulse voltage, energy-increased control pulses are controlledly applied to distribute among elementary machining pulses; this allows the gap control to be achieved with extreme ease and security. Since the machining gap is accordingly controlledly held under optimum condition at all times, a succession of stabilized machining discharges with the enhanced effect of gap clarification intervals allow a marked increase in removal rate and efficiency.

It will be apparent that various modifications are possible in the foregoing embodiments of the invention. For example, the oscillator 5 may be connected with the oscillator 6 in cascade so that the former 5 may operate to provide signal trains of elementary pulses selectively when the latter provides train pulse Ton periods. Also, the distribution of energy-increased pulses among elementary machining pulses is achieved in any of various manners. To this end, a power supply exclusively for energy-increased pulses may be connected across the machining gap in parallel with the power supply for elementary machining pulses for a joint operation therewith.

Figure 6:
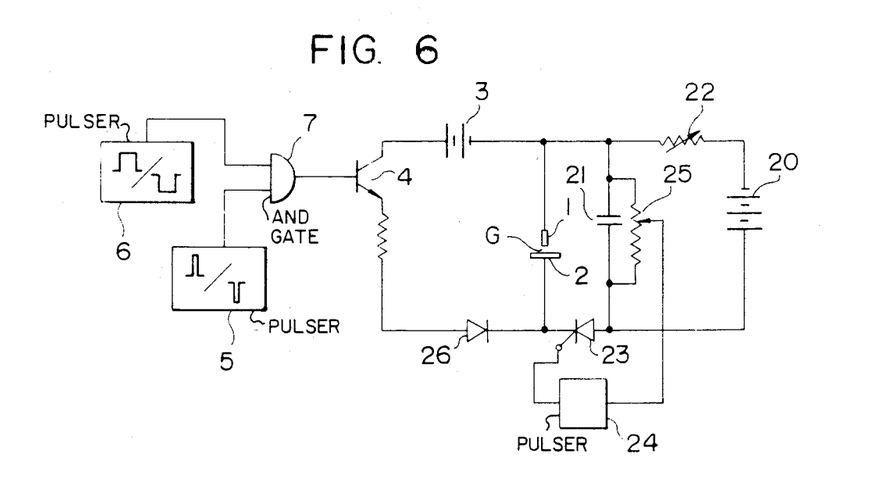
FIG. 6 is a circuit diagram illustrating a further embodiment of the invention in which elementary machining pulses are applied from a capacitor storage system.

Accordingly, an embodiment of the invention illustrated in FIG. 6 includes a main power supply comprising the direct-current source 3 connected to the tool electrode 1 and the workpiece 2 in series with the power switch 4 which, in the manner shown earlier, has at its input the AND gate to which the elementary pulse oscillator 5 and the train pulse oscillator 6 are joined together to apply a succession of trains Ton, Toff of elementary machining pulses (Ton, Toff) across the machining gap G. An auxiliary power supply comprises a direct-current source 20 which has its output voltage higher than that of the main DC source and which has a storage capacitor 21 connected across the machining gap G in parallel therwith via a charging resistor 22. The discharge circuit of the capacitor 21 includes a power switch 23, here shown comprising a thyristor, which is energized by a pulser 24 in response to the charging voltage of the capacitor 21 sensed at the resistor 25 connected thereacross. A blocking diode 26 is connected in series with the main DC source 3 and the main power switch 4 to block current flow from the auxiliary voltage source 20 into the primary circuit.

While, on the one hand, the main power switch 4 is repetitively being turned on and off to provide trains (Ton, Toff) of elementary machining pulses ($\tau on$, $\tau off$), the capacitor 21 is repetitively charged and discharged to provide a series of energy-increased pulses so that a distribution of the latter among elementary machining pulses is produced across the machining gap G. The energy-increased pulses are advantageously produced by the capacitor 21 charged by the auxiliary source 20 higher in output voltage than the main source 3 and discharged instantaneously across the machining gap with an increased peak current. The proportion of the distribution of energy-increased pulses among elementary machining pulses may be controlled by way of the charging resistor 22 which determines the charging rate. The pulser 24 is responsive to a trigger signal which is produced each time the capacitor 21 is sensed by the resistor 25 to reach a preset charging level to trigger the switch 23 to allow the charge on the capacitor 21 to be instantaneously discharged through the machining gap G. The peak current of discharges is determined by the capacitance of the capacitor 21 and the resistance in the discharge circuit.

EXAMPLE II

The capacitor 21 had a capacitance of 0.05 $\mu F$ and was connected with the tool electrode 1 and the workpiece 2 with a minimum conductor length such that the discharge circuit has an inductance of 0.2 $\mu H$. This established energy-increased pulses of a pulse duration of 0.1 $\mu sec$ and a peak current of 200 A which are applied in distribution among elementary pulses having $\tau on = 13$ $\mu sec$, $\tau off = 13$ $\mu sec$ and $Ip = 50$ A at a proportion of 3% in total energy. Using a W-Cu tool electrode, this enables a steel workpiece to be machined at a removal rate of 0.3 gr/min with a surface roughness of 13 $\mu Rmax$ and a relative electrode wear of 3%. In comparison, without the energy-increased pulses the removal rate, surface roughness and relative electrode wear had 0.12 gr/min, 13 μRmax and 13%, respectively.

Figure 7:
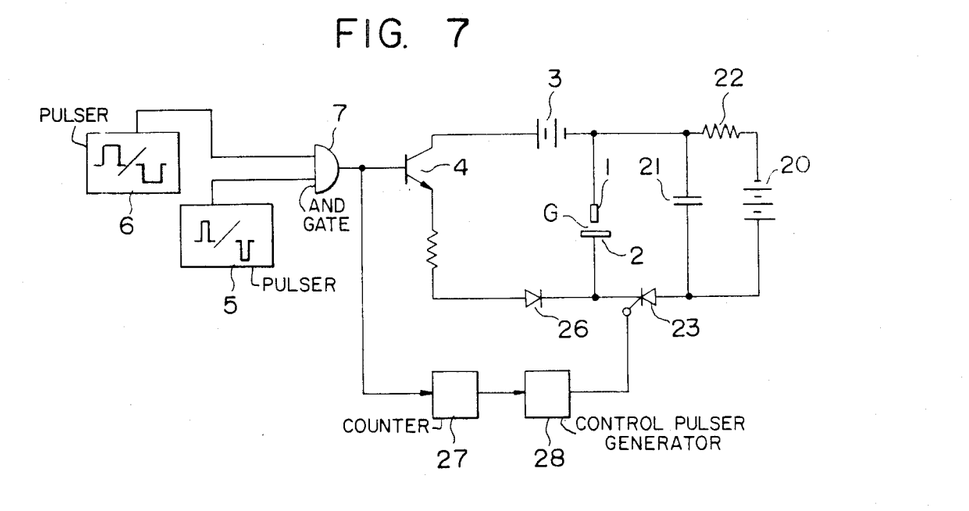
FIGS. 7 and 8 are circuit diagrams illustrating modifications of the circuitry of FIG. 6.

FIG. 7 shows a modification of the system of FIG. 6 in which the output of the AND gate for energizing the main pulse switch 4 is applied also to the auxiliary power switch 23 via a preset counter 27 and a control pulse generator 28. Here, the counter 27 is reset every time a predetermined number of elementary pulses are counted to actuate the pulser 28 which in turn energizes the switch 23 with a trigger pulse to allow the capacitor 21 to be discharged through the machining gap to form an energy-increased pulse.

Figure 8:
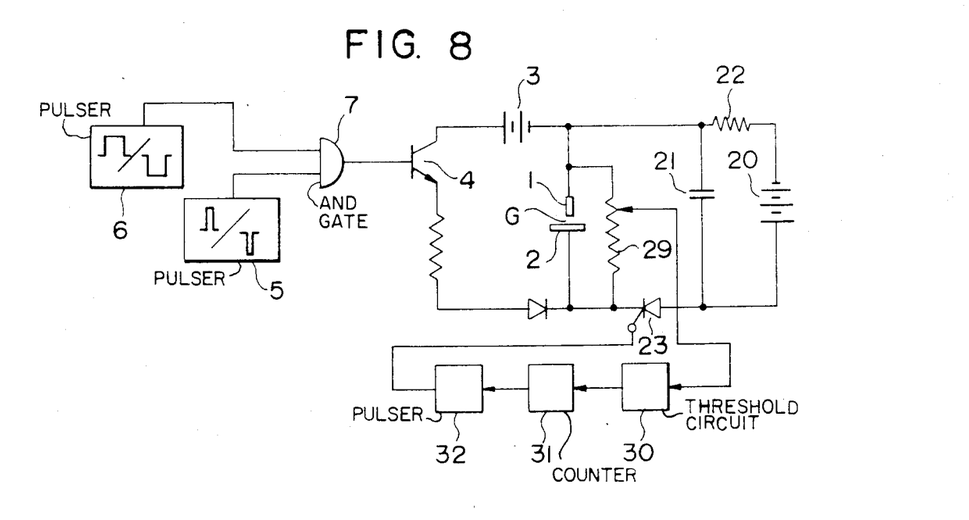

In a further modified embodiment of FIG. 8, a gap sensing resistor 29 is connected across the machining gap G and feeds into a threshold circuit 30 which determines whether each gap pulse is sensed to result in an abnormal discharge. When a preset number of "abnormal discharge" pulses are counted by a counter 31, a pulser 32 turns on the switch 23 with a trigger pulse so that an energy-increased pulse is discharged from the capacitor 21.

There is thus provided, in accordance with the present invention, an improved EDM method and apparatus whereby instability of the machining actions in the machining gap due to an excessively reduced gap spacing is avoided or overcome, and whereby an increased removal rate and efficiency ensue.

What is claimed is:

1. A method of the electrical-discharge-machining of a workpiece juxtaposed with a tool electrode across a fluid-filled machining gap, the method comprising the steps of:

applying across said machining gap a succession of machining pulse trains individually consisting of elementary machining pulses of predetermined on-time $\tau$on and off-time $\tau$off, the machining pulse trains having a duration Ton with the successive trains being separated by a cut-off time interval Toff, said elementary machining pulses in each train being substantially uniform in energy consumption and having a predetermined value of individual peak current Ip multiplied by individual on-time $\tau$on preset to yield a particular EDM surface roughness when applied in said train; and modifying at least one of said elementary pulses in each train to increase its peak current Ip multiplied by its on-time $\tau$on to be substantially higher than said predetermined value to such an extent as to materially stabilize resulting elementary machining discharges against variation in gap conditions but not to substantially alter said particular EDM surface roughness.

2. The method defined in claim 1 wherein the proportion of said modified elementary machining pulse over the remaining elementary pulses in each train is not greater than 15%.

3. The method defined in claim 2 wherein said proportion is equal to or less than 10%.

4. The method defined in claim 1 wherein aid $\tau$on ranges between 1 and 100 μsec, said $\tau$off ranges between 10 and 50 μsec and said Ton and Toff range each between 10 μsec and 1 msec.

5. The method defined in claim 1 wherein said predetermined value of the peak current Ip multiplied bu the on-time $\tau$on of at least one of said elementary machining pulses is increased by increasing the peak current Ip thereof.

6. The method defined in claim 1 wherein said predetermined value of the peak current Ip multiplied by the on-time $\tau$on of at least one of said elementary machining pulses is increased by increasing both the peak current Ip and the pulse duration $\tau$on thereof.

7. The method defined in claim 1 wherein the modified pulses are produced for a predetermined number of said elementary machining pulses.

8. The method defined in claim 1, further comprising the steps of sensing the machining gap to detect its tendency toward abnormal condition and, in response thereto, initiating said step of modifying at least one of said elementary machining pulses.

9. The method defined in claim 8 wherein said tendency is detected by counting said elementary machining pulses applied across the machining gap with unsatisfactory performance therein and detecting said count exceeding a predetermined threshold to provide a control signal for effecting the modification of said at least one of elementary machining pulses.

10. An apparatus for the electrical-discharge-machining of a workpiece electrode with a tool electrode across a fluid-filled machining gap, comprising:

power supply means for applying across said gap a succession of time-spaced maching pulse trains individually consisting of uniform time-spaced elementary machining pulses of predetermined on-time $\tau$on and off-time $\tau$off, the pulse trains having a duration Ton with the successive trains being separated by a cut-off time interval Toff;

setting means for presetting the peak current Ip multiplied by the on-time $\tau$on of said individual elementary machining pulses in each train at a predetermined value so as to yield, when they are applied in said time-spaced trains, a particular EDM surface roughness desired; and means associated with said power supply means for modifying at least one of said elementary machining pulss in each train so as to distribute among said elementary maching pulses in each train at least one modified elementary machining pulse having a peak current Ip multiplied by an on-time $\tau$on increased over said predetermined value to such an extent as to materially stabilize resulting elementary machining discharges against variation in gap conditions but not to substantially alter said particular EDM surface roughness.

11. The apparatus defined in claim 10 wherein said power supply means comprises a main DC source and a power switch for connecting said main DC source with the machining gap to apply thereacross said succession of pulse trains of elementary pulses; and said means associated with said power supply means includes an auxiliary DC source having an output voltage higher than that of said main DC source, a capacitor connected with said auxiliary DC source for charging thereby and a second power switch connecting said capacitor through said machining gap and adapted to be controlledly turned on for discharging electrical charge on said capacitor through said machining gap hereby providing said modified elementary machining pulse therethrough and distributing it among said elementary machining pulses in each train.

12. The apparatus defined in claim 11, further comprising circuit means responsive to the terminal voltage of said capacitor to provide a trigger signal upon said terminal voltage exceeding a predetermined level and a pulser responsive to said trigger signal for turning on said second switch to discharge said capacitor.

13. The apparatus defined in claim 11 or 12, further comprising means for sensing the machining gap to detects its tendency toward abnormal conditions to provide a control signal and means responsive to said control signal for permitting said second switch to be turned on.

14. A method of electrical discharge machining of a workpiece juxtaposed with a tool electrode across a fluid-filled machining gap, the method comprising the steps of:

applying across said machining gap a succession of time-spaced machinery pulse trains individually consisting of elementary machining pulses of predetermined on-time $\tau on$ and off-time $\tau off$, the pulse trains having a duration Ton with the successive trains being separated by a cut-off time interval Toff;

presetting said elementary machining pulses to possess a predetermined value of their individual peak current Ip multiplied by their individual on-time so as to yield, when they are applied in said time-spaced trains, a particular surface roughness desired; and modifying at least one of said elementary machining pulses in each train to increase its peak current Ip multiplied by its on-time $\tau on$ to be substantially higher than said predetermined value to such an extent as to materially stabilize resulting elementary machining discharges against variation in gap conditions but not to substantially alter said particular EDM surface roughness, the increase in said predetermined value being effected by at least one of the steps of
(a) increasing peak current, and
(b) increasing pulse duration.

15. An apparatus for the electrical discharge machining of a workpiece electrode with a tool electrode across a fluid-filled machining gap, comprising:

means for applying across said machining gap a succession of time-spaced machining pulse trains individually consisting of elementary machining pulses of predetermined on-time and off-time with the pulse trains having a total duration and successive trains being separated by a cut-off time interval;

means for presetting an energy consumption of said individual elementary machining pulses at a predetermined value such as to yield, when they are grouped and applied in said time-spaced trains, a particular prescribed set of machining results; and means for modifying at least one of said elementary machining pulses in each train to apply across said gap at least one modified elementary machining pulse of each train with an energy consumption substantially higher than the energy consumption of each elementary pulse of the majority of those remaining of the train such that the stability of the resulting elementary machining discharges is substantially improved but said set of results in substantially unaffected.

16. The apparatus defined in claim 15 wherein the last-mentioned means includes means responsive to a variation in a gap condition for controlledly inserting into a sequence of pulses adapted to generate the succession of pulse trains, an energy-increased pulse for the respective train to stabilize machining at the gap.

* * * * *